United States Patent
Dechu et al.

(10) Patent No.: US 12,204,867 B2
(45) Date of Patent: Jan. 21, 2025

(54) PROCESS MINING ASYNCHRONOUS SUPPORT CONVERSATION USING ATTRIBUTED DIRECTLY FOLLOWS GRAPHING

(71) Applicant: International Business Machines Corporation, Armonk, NY (US)

(72) Inventors: Sampath Dechu, Bangalore (IN); Monika Gupta, Gurugram (IN); Prerna Agarwal, New Delhi (IN); Renuka Sindhgatta Rajan, Bengaluru (IN); Naveen Eravimangalath Purushothaman, Thrissur (IN)

(73) Assignee: International Business Machines Corporation, Armonk, NY (US)

( * ) Notice: Subject to any disclaimer, the term of this patent is extended or adjusted under 35 U.S.C. 154(b) by 304 days.

(21) Appl. No.: 17/655,875

(22) Filed: Mar. 22, 2022

(65) Prior Publication Data
US 2023/0306204 A1 Sep. 28, 2023

(51) Int. Cl.
*G06F 40/35* (2020.01)
*G06F 16/65* (2019.01)
*G06F 40/117* (2020.01)
*G06F 40/166* (2020.01)
*G06F 40/279* (2020.01)

(52) U.S. Cl.
CPC .............. *G06F 40/35* (2020.01); *G06F 16/65* (2019.01); *G06F 40/117* (2020.01); *G06F 40/166* (2020.01); *G06F 40/279* (2020.01)

(58) Field of Classification Search
CPC ...... G06F 40/35; G06F 40/166; G06F 40/117; G06F 40/279; G06F 40/205; G06F 16/65; G06Q 30/016; G10L 15/22
See application file for complete search history.

(56) References Cited

U.S. PATENT DOCUMENTS

| 11,056,107 B2 * | 7/2021 | Nahamoo | ............... G10L 15/22 |
| 11,081,110 B2 * | 8/2021 | Kwak | ..................... G10L 15/22 |

(Continued)

FOREIGN PATENT DOCUMENTS

WO 2020219203 A1 10/2020

OTHER PUBLICATIONS

Svitlana Vakulenko, Kate Revoredo, Claudio Di Ciccio, Maarten de Rijke, QRFQ: A Data-driven model of Information-seeking dialogues, arXiv: 1812.10720v1 [cs.IR] Dec. 27, 2018 (Year: 2018).*

(Continued)

*Primary Examiner* — Paras D Shah
*Assistant Examiner* — Nadira Sultana
(74) *Attorney, Agent, or Firm* — Michael O'Keefe

(57) ABSTRACT

Provided is a computer-implemented method, system, and computer program product for process mining asynchronous support conversations using attributed directly follows graphing. A processor may collect a plurality of conversation threads from an asynchronous data stream. The processor may label each utterance of a plurality of utterances from the plurality of conversation threads with an event label. The processor may analyze the event label for each utterance of the plurality of utterances. The processor may generate, based on the analyzing of the event label for each utterance, an attributed directly follows graph (DFG).

20 Claims, 15 Drawing Sheets

(56) References Cited

U.S. PATENT DOCUMENTS

| | | | |
|---|---|---|---|
| 11,151,578 B2* | 10/2021 | Amittai | G06Q 30/016 |
| 11,501,776 B2* | 11/2022 | Wei | G10L 15/22 |
| 2013/0211880 A1 | 8/2013 | Kannan et al. | |
| 2020/0193094 A1 | 6/2020 | Topol | |
| 2021/0374356 A1* | 12/2021 | He | G06N 3/045 |
| 2023/0126821 A1* | 4/2023 | Gao | G06F 40/205 |
| | | | 704/9 |

OTHER PUBLICATIONS

G. Alan Wang, Harry Jiannan Wang, Jiexun Li, Weiguo Fan, Mining Knowledge Sharing Processes in online Discussion Forums, IEEE, 2014, pp. 3898-3907 (Year: 2014).*

Jalali, A. "Graph-based process mining," https://arxiv.org/abs/2007.09352, Jul. 18, 2020, 14 pgs.

Legg, et al., "Visual analytics for collaborative human-machine confidence in human-centric active learning tasks," https://hcis-journal.springeropen.com/articles/10.1186/s13673-019-0167-8, Hum. Cent. Comput. Inf. Sci. (2019) 9:5, 25 pgs.

Mell et al., "The NIST Definition of Cloud Computing," Recommendations of the National Institute of Standards and Technology, U.S. Department of Commerce, Special Publication 800-145, Sep. 2011, 7 pgs.

\* cited by examiner

| Conversation Log | Chat | Timestamp |
|---|---|---|
| User 1 | Hi, I am not able to charge my laptop | 10:00 |
| User 1 | What is the process to get temporary laptop | 10:01 |
| Skilled User 1 | I will raise the request for temporary laptop and raise ticket for maintenance | 11:00 |
| User 1 | Thanks @Skilled User 1 | 11:10 |

FIG. 4B             FIG. 4C

| Conversation Log | Chat | Timestamp |
|---|---|---|
| User 1 | Hi, I am not able to charge my laptop | 10:00 |
| User 1 | I verified that the power adapter is not an issue | 10:45 |
| User 1 | I tried with a different power adaptor that works | 10:46 |
| Skilled User 1 | @Skilled User 2 can you look at it? | 10:47 |
| Skilled User 2 | Thanks @Skilled User 1 | 10:49 |
| Skilled User 2 | I will raise temporary laptop for you | 11:00 |
| User 1 | Thanks @Skilled User 2 | 11:01 |

| Attribute | Frequency | Percentage | Service Time | Throughput |
|---|---|---|---|---|
| Dave Brown | 303 | 13.34% | 38mins 8s | 1h 35mins |
| Jane Doe | 213 | 9.38% | 19mins 5s | 55min 19s |
| DevOps Bot | 179 | 7.88% | 55mins 48s | 2h 8mins |
| John Smith | 151 | 6.65% | 1min 29s | 13 mins 25s |

PROCESS MINING ASYNCHRONOUS SUPPORT CONVERSATION USING ATTRIBUTED DIRECTLY FOLLOWS GRAPHING

BACKGROUND

The present disclosure relates generally to the field of process mining and, more specifically, to process mining asynchronous support conversations and digital assistant execution logs using attributed directly follows graphing techniques.

Process mining is a family of techniques used to analyze transactional records associated to a given business process, also known as an event log, in order to extract insights about the performance of the process. Among other things, process mining techniques allow for generation and/or discovery of a process model from an event log, an operation known as automated process discovery. Automatically discovered process models allow analysts to understand how the process is executed in reality and to uncover unexpected behavior. When enhanced with performance information or attributes (e.g., average activity durations or waiting times), such models are also used for performance analysis, e.g., to detect bottlenecks, inefficiencies, and the like.

SUMMARY

Embodiments of the present disclosure include a computer-implemented method, system, and computer program product for process mining asynchronous support conversations using attributed directedly follows graphing. A processor may collect a plurality of conversation threads from an asynchronous data stream. The processor may label each utterance of a plurality of utterances from the plurality of conversation threads with an event label. The processor may analyze the event label for each utterance of the plurality of utterances. The processor may generate, based on the analyzing of the event label for each utterance, an attributed directly follows graph (DFG).

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

FIG. 4B illustrates an example DFG, in accordance with some embodiments of the present disclosure.

FIG. 4C illustrates an example DFG with edge rationalization applied, in accordance with some embodiments of the present disclosure.

FIG. 11 illustrates an example attribute table associated with an attributed DFG, in accordance with some embodiments of the present disclosure.

Figure 1:
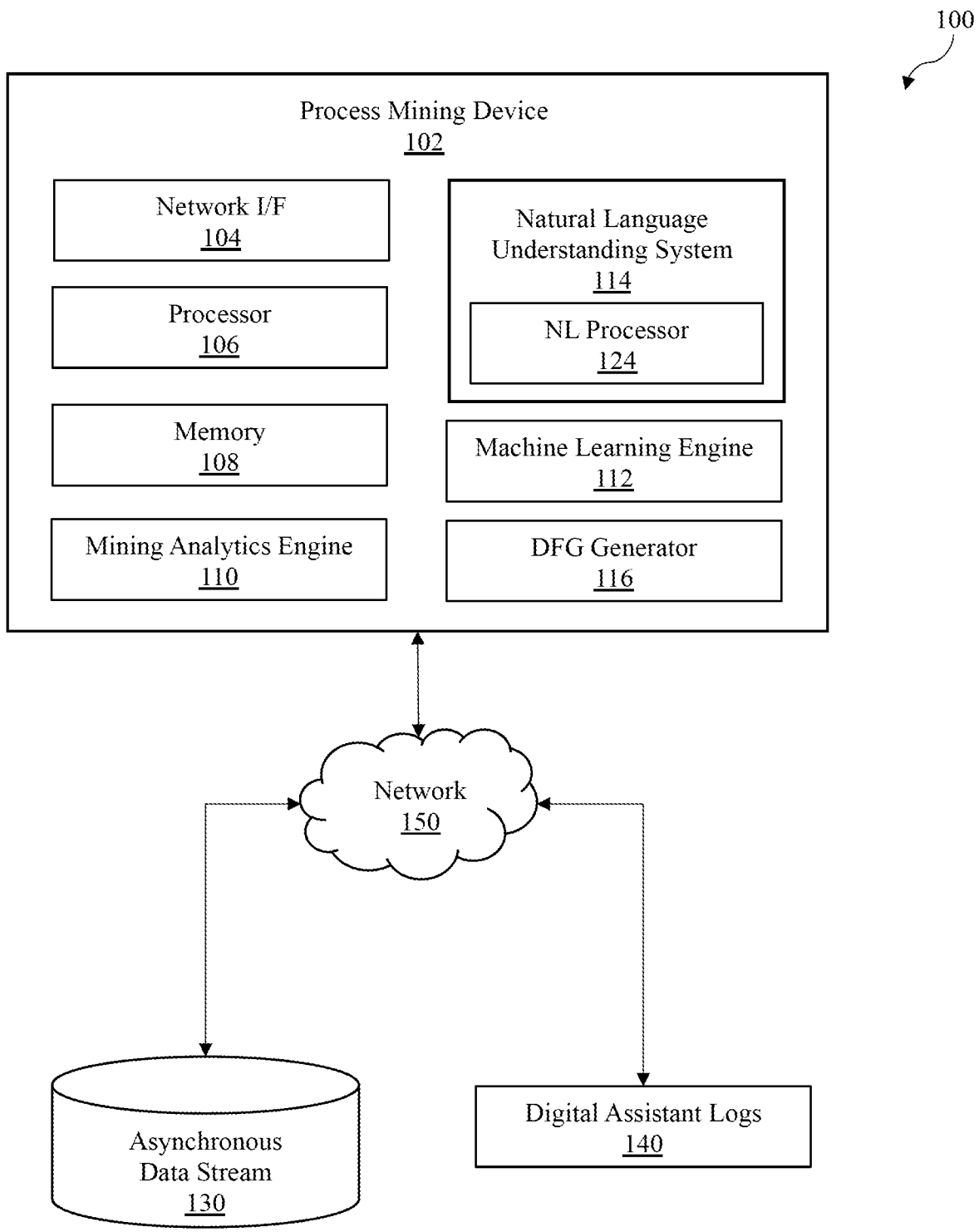
FIG. 1 illustrates an example process mining system, in accordance with some embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate to the field of process mining and, more particularly, to process mining asynchronous support conversations and digital assistant execution logs using attributed directly follows graphing techniques. While the present disclosure is not necessarily limited to such applications, various aspects of the disclosure may be appreciated through a discussion of various examples using this context.

Asynchronous communications are when two or more users (e.g., people, IT support personnel, digital assistants, etc.) can communicate without the requirement that they be "present" at the same exact moment in time. Typically, IT support conversations within a messaging channel are examples of asynchronous support conversations. IT support conversations usually involve one or more users requesting some type of computing related task to be performed by the IT support personnel/user. In some instances, the IT support personnel may utilize a digital assistant (e.g., bot) to aid in completing the task. However, in some instances the IT support personnel may not be able to successfully complete the task. This may occur because the IT support personnel does not have the requisite skill, time, or manpower to complete the task or as a result of a digital assistant failing to complete an automated task. These occurrences may create various IT support bottlenecks when assisting users in hybrid workforces.

Embodiments of the present disclosure include a system, computer-implemented method, and computer program product that apply process mining techniques to identify various issues and/or bottlenecks related to IT support conversations within a hybrid workforce environment by generating an attributed directly follows graphs (DFG). Using the attributed DFG, the system may identify where issues with IT support (either IT personnel and/or digital assistants) occur within the IT support conversations and/or digital assistant logs and rectify the issues accordingly. Further, applying process mining techniques using the attributed DFG allows for measuring the human and digital assistant collaboration effectiveness in the hybrid workforce environment.

In embodiments, the system may collect a plurality of conversation threads from an asynchronous data stream and/or a digital assistant execution log. For example, the system may collect conversation threads from messaging channels where IT support and various users interact to complete various tasks (e.g., resolving software/hardware related issues, answering queries, performing IT specific actions, automated tasks, etc.). The plurality of conversation threads may comprise a plurality of utterances from each user in the given conversation thread. In embodiments, each utterance may comprise a single word or a plurality of words (e.g., sentences, messages, actions, etc.) that are generated by the given user in the conversation thread. Further, the system may collect digital assistant logs that indicate digital assistant(s) performance of various tasks related to the conversation thread within the hybrid workforce environment. The digital assistant execution log may comprise a plurality of task execution instances related to a given digital assistant. The task execution instances may indicate whether a given task was successfully or unsuccessfully performed by a digital assistant associated with the conversation threads.

In embodiments, the system may label each utterance of the plurality of utterances from the plurality of conversation threads with an event label (e.g., a-event). Each event label may include a plurality of attributes. Attributes may include an identification value, activity type, timestamp information, trace information, event log information for each utterance of the plurality of utterances. The attributes may be used to determine performance metrics of the support process workflow in the DFG such as determining average activity durations or waiting times for the various completion (or incompletion) of tasks within the conversation threads.

In embodiments, the system may analyze the event labels for each utterance of the plurality of utterances. The analyzing may include generating, for each thread of the plurality of conversation threads, a role-specific ordered list of users within the given thread. In embodiments, the respective user (e.g., based on username/profile) associated with each utterance is replaced with an index of the user in the role-specific order list. In embodiments, the ordered list may be used to index the users of the conversation thread and group the utterances by user nodes to reduce node frequency when generating the DFG. For example, the width of the DFG has a size that is n_roles and the length is a number of unique participants in the conversation thread.

In embodiments, the system may classify each utterance of the plurality utterances that are associated with each user of each thread to identify a type of utterance. In embodiments, the system may classify a given utterance of the plurality of utterances as, for example, an acknowledgement, status query, information query, an action (e.g., performance of a task), or a handover. Using the classification of the utterances, the system may group utterances according to the type and user.

In embodiments, the system may merge two or more utterances of the plurality of utterances that have a temporal proximity from a same user within the thread. For example, a user may generate multiple utterances in a short period of time in a conversation thread. The system may analyze these utterances and merge them into a single utterance if they are within a temporal proximity threshold. In embodiments, the system may filter one or more utterances that failed to be classified. For example, the system may filter out "chit chat" and/or non-essential utterances (e.g., greetings) that were not classified by the system. In some embodiments, the system may classify these types of utterances as non-essential and filter them out when generating the DFG. In this way, the system rationalizes edges of the DFG by reducing the amount of edges/connections related to each individual utterance by merging utterances and removing non-essential conversations.

In embodiments, the system may mark, based on the event labels and contextual data within the conversation thread, any classification transition beyond a time proximity threshold as a turn boundary in a conversation. For example, the system may identify where a conversation was taken up by a new user or if the conversation transitioned to a new topic/task.

In embodiments, the system may generate, based on the analyzing steps above, an attributed directly follows graph (DFG). In embodiments, the generated attributed DFG transforms the asynchronous conversation threads into domain specific attributed activity trace instances with rationalized edges and nodes for use in visual analytics. For example, the generated attributed DFG includes a minimized edge and node frequency as a result of edge/node rationalization. Further, the path frequency and size of the paths related to the edges are minimized. In this way, the generated attributed DFG's "fuzziness" or "spaghetti-ness" is significantly reduced, which visually provides a much more valuable tool when evaluating a process workflow using visual analytics.

In embodiments, the system may perform domain specific attribute feature engineering using the attributed DFG. For example, the system may use the attributed DFG to identify a frequency, a percentage, a service time, and/or a throughput for completing a specific task (or topics) within a conversation thread with respect to the role-specific users.

In some embodiments, the system may analyze the attributed DFG to identify one or more incomplete conversations within the plurality of conversation threads. Incomplete conversations may be correlated with unsuccessful task performance by a user (e.g., skilled user, digital assistant, etc.). In some embodiments, the system may identify, based on the analyzing, a digital assistant has failed to complete a task associated with a conversation thread. In some embodiments, the system may evaluate the digital assistant that has failed to complete the task and implement an update to the digital assistant in order to complete the task.

The aforementioned advantages are example advantages, and not all advantages are discussed. Furthermore, embodiments of the present disclosure can exist that contain all, some, or none of the aforementioned advantages while remaining within the spirit and scope of the present disclosure.

With reference now to FIG. 1, shown is a block diagram of an example process mining system 100 in which illustrative embodiments of the present disclosure may be implemented. In the illustrated embodiment, the process mining system 100 includes process mining device 102 that is communicatively coupled to asynchronous data stream 130 and digital assistant logs 140 (e.g., a server that includes the logs) via network 150. In embodiments, process mining device 102, asynchronous data stream 130, and digital assistant logs 140 may be configured as any type of computer system and may be substantially similar to computer system 1401 of FIG. 14. For example, asynchronous data stream 130 and digital assistant logs 140 may be configured as various messaging websites and/or servers hosted on communicatively coupled computer systems where asynchronous conversation threads and/or digital assistant logs may be collected and analyzed to generate one or more directly follows graphs (DFGs). In some embodiments, the asynchronous data stream 130 and digital assistant logs 140 may be local to the process mining device 102 itself.

In embodiments, network 150 may be any type of communication network, such as a wireless network, edge computing network, a cloud computing network, or any combination thereof (e.g., hybrid cloud network/environment). Network 150 may be substantially similar to, or the same as, cloud computing environment 50 described in FIG. 15. Consistent with various embodiments, a cloud computing environment may include a network-based, distributed data processing system that provides one or more edge/network/cloud computing services. Further, a cloud computing environment may include many computers (e.g., hundreds or thousands of computers or more) disposed within one or more data centers and configured to share resources (e.g., asynchronous data/threads, digital assistant logs) over network 150.

In some embodiments, network 150 can be implemented using any number of any suitable communications media. For example, the network may be a wide area network (WAN), a local area network (LAN), an internet, or an intranet. In certain embodiments, the various systems may be local to each other, and communicate via any appropriate local communication medium. For example, process mining device 102 may communicate with asynchronous data stream 130 and digital assistant logs 140 using a WAN, one or more hardwire connections (e.g., an Ethernet cable), and/or wireless communication networks. In some embodiments, the various systems may be communicatively coupled using a combination of one or more networks and/or one or more local connections. For example, in some embodiments process mining device 102 may communicate with digital assistant logs 140 locally, while communication between asynchronous data stream 130 may be through a wireless communication network or hardwired connection.

In embodiments, process mining device 102 includes processor 106 and memory 108. The process mining device 102 may be configured to communicate with asynchronous data stream 130 and digital assistant logs 140 through an internal or external network interface 104. The network interface 104 may be, e.g., a modem or a network interface card. The process mining device 102 may be equipped with a display or monitor. Additionally, the process mining device 102 may include optional input devices (e.g., a keyboard, mouse, scanner, or other input device), and/or any commercially available or custom software (e.g., browser software, communications software, server software, natural language processing/understanding software, search engine and/or web crawling software, filter modules for filtering content based upon predefined parameters, etc.).

In some embodiments, the process mining device 102 may include mining analytics engine 110, machine learning engine 112, natural language understanding (NLU) system 114, and directly follows graph (DFG) generator 116. The NLU system 114 may include a natural language processor 124. The natural language processor 124 may include numerous subcomponents, such as a tokenizer, a part-of-speech (POS) tagger, a semantic relationship identifier, and a syntactic relationship identifier. An example natural language understanding system is discussed in more detail in reference to FIG. 13.

In embodiments, mining analytics engine 110 is configured to collect, monitor, and/or analyze asynchronous data stream 130. For example, the mining analytics engine 110 will collect a plurality of conversation threads from asynchronous data stream 130. The mining analytics engine 110 is configured to generate an event label (e.g., a-event label) to each utterance of the plurality of conversation threads. The event label may include various attributes used to classify the utterances for the given conversation threads. For example, the system may input each utterance/message by a user of a conversation thread as:

Input—message: (cinst_id, user, utterance, timestamp) and

Output—a-event: (cinst_id, a-label, utterance, timestamp).

For example, the input message may include a trace ID or case instance ID (e.g., cinst_id), the username/user that generated the utterance/message, and timestamp information. The output may label the message as an event (e.g., a-event), where the username/user is replaced with the event label (a-label).

In embodiments, mining analytics engine 110 may generate a role-specific ordered list of each user for the conversation thread. For example, the mining analytics engine 110 may prepare role-specific list by classifying the users according to their work status (e.g., regular user, skilled user, digital assistant, etc.). For example, mining analytics engine 110 will group regular users as uniq(U1, U2, U3), skilled users or IT personnel as uniq(S1, S2, S3), and digital assistants (or bots) as uniq(B1, B2, B3) rather using their specific usernames. The mining analytics engine 110 may analyze each utterance of the threads and replace the given users with the index of the user in the role-specific ordered list. Using the role-specific ordered list, the width of the generated DFG has a size that is n_roles and the length is a number of unique participants in the conversation thread.

In embodiments, mining analytics engine 110 may perform edge and/or node rationalization on the labeled plurality of conversation threads. Edge/node rationalization is configured to reduce edges within the attributed DFG by eliminating and/or streamlining the nodes/edges of the DFG. In embodiments, the mining analytics engine 110 may perform edge/node rationalization by merging utterances with temporal proximity from the same user from each of the conversation threads. In embodiments, mining analytics engine 110 may classify each of the utterances to differentiate messages as continuing messages and/or a new turn/handoff in the message. Classification types may include an acknowledgment, status query, information query, an action, and/or handovers to other users. In embodiments, mining analytics engine 110 may mark class transitions in the messages that exceed a time proximity threshold as a turn boundary. In embodiments, mining analytics engine 110 may determine that utterances that result in a handover to another user may be removed in order to reduce the nodes/edge in the DFG. For example, when a conversation thread involves a first skilled user handing over a task to a second user to complete, the first skilled user may be removed from labeled utterance used to generate the DFG.

In embodiments, mining analytics engine 110 may filter any utterances that were not provided a classification type. For example, "chit chat" and/or greeting utterances may not be classified or may be provided a non-essential classification. The mining analytics engine 110 may then filter out the non-essential utterances. In embodiments, mining analytics engine 110 may mark start time and end times for turn start to turn end for identifying the duration of a turn.

In embodiments, mining analytics engine 110 may utilize NLU system 114 to classify types of utterances. For example, the NLU system 114 may analyze the unstructured textual data of the utterance "please provide me a status update regarding my laptop" and classify the utterance as a status query. Further details regarding NLU system are discussed in FIG. 13.

Figure 2:
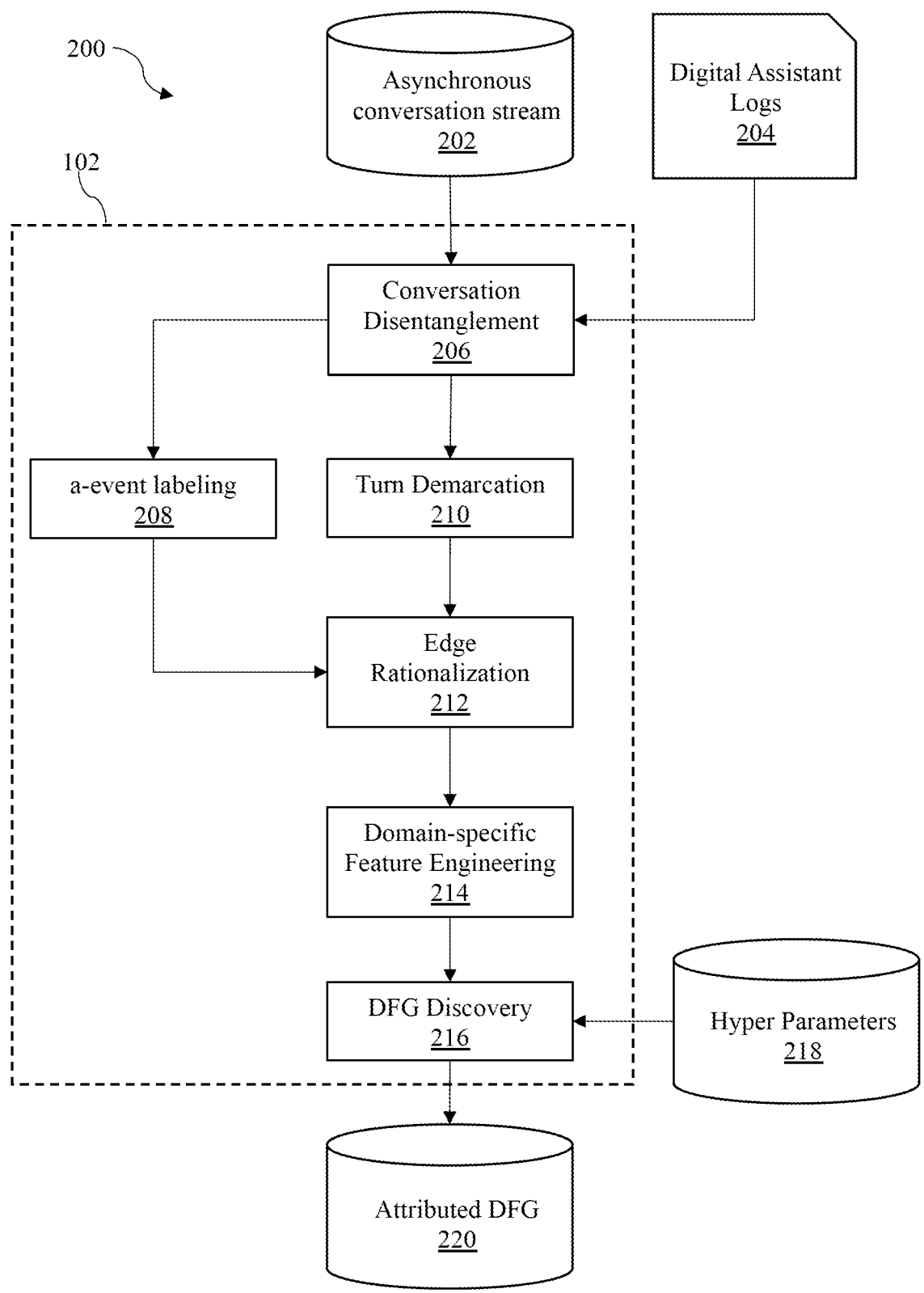
FIG. 2 illustrates an example diagram for generating an attributed DFG using a process mining system, in accordance with some embodiments of the present disclosure.

In some embodiments, mining analytics engine 110 may include various subcomponents such as the components described in FIG. 2. For example, mining analytics engine may include a conversation disentanglement component, a-event labeling component, turn demarcation component, edge rationalization component, domain-specific engineering component, and DFG discovery component.

In embodiments, DFG generator 116 is configured to generate an attributed DFG from the analyzed conversation threads and digital assistant logs. The attributed DFG may be used to evaluate hybrid workforce performance by analyzing, e.g., average activity durations or waiting times for completing tasks within the conversation threads by the role-specific users. An example attributed DFG is described in FIG. 10 and FIG. 11.

In embodiments, the process mining device 102 may use a machine learning engine 112 to improve its capabilities automatically through experience and/or repetition without procedural programming. For example, machine learning engine 112 may analyze the accuracy of the classifying of the utterances of each conversation thread by analyzing feedback from the user (e.g., manual changes to classification types). The machine learning engine 112 may determine that confidence values for classification of the utterance type were incorrect based on analyzing user manipulation and may automatically increase/decrease confidence thresholds and/or adjust the specificity of confidence value determinations. In this way, the system may become more accurate in analyzing and classifying the asynchronous conversations initially without manual user adjustment. In some embodiments, machine learning engine 112 may automatically determine where bottlenecks in the IT support functions occur. In some embodiments, the machine learning engine 112 may automatically fix issues where bottle necks occur based on analysis of the attribute DFG. For example, the machine learning engine may update and/or modify various algorithms used by a digital assistant that has been identified as failing to complete one or more tasks. In some embodiments, the machine learning engine may modify assignments to skilled users within a process workflow within the hybrid workforce environment.

Machine learning algorithms can include, but are not limited to, decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques.

For example, the machine learning algorithms can utilize one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBDT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feed-forward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

It is noted that FIG. 1 is intended to depict the representative major components of an exemplary processing mining system 100. In some embodiments, however, individual components may have greater or lesser complexity than as represented in FIG. 1, components other than or in addition to those shown in FIG. 1 may be present, and the number, type, and configuration of such components may vary.

For example, while FIG. 1 illustrates a processing mining system 100 with a single process mining device 102, a single asynchronous data stream 130, a single digital assistant log 140, and a single network 150, suitable computing environments for implementing embodiments of this disclosure may include any number of process mining systems, process mining devices, asynchronous data streams, digital assistant logs, and networks. The various modules, systems, and components illustrated in FIG. 1 may exist, if at all, across a plurality of process mining systems, process mining devices, data streams, digital assistant logs, and networks.

Referring now to FIG. 2, shown is an example diagram 200 for generating an attributed DFG, in accordance with some embodiments of the present disclosure. In the illustrated embodiment, process mining device 102 of FIG. 1 may collect conversation threads from an asynchronous conversation stream 202 and associated digital assistant execution tasks from digital assistant logs 204.

The process mining device 102 may utilize a conversation disentanglement component 206 on the conversation threads and associated digital assistant logs. The conversation disentanglement component 206 may be configured to identify user-specific roles for users involved in each thread. For example, users may be grouped as standard users, skilled users, or digital assistants based on the conversation thread and/or profile information associated to the user type. Further, the conversation disentanglement component 206 may utilize the digital assistant logs to identify where a digital assistant was used to perform a task (e.g., IT support task) associated with the conversation thread.

In embodiments, the process mining device 102 may utilize an event labeling component 208 to generate an event label (a-event) for each utterance of the conversation thread. The event label may include a plurality of attributes. Attributes may include an identification (ID) value, activity type, timestamp information, trace information, and event log information for each utterance of the plurality of utterances within the conversation threads.

In embodiments, the processing mining device 102 may use a turn demarcation component 210 to identify and/or demarcate turn sessions within each conversation thread. A turn session or turn may be categorized based on where a first user's messages/utterances start and stop and a second user's messages/utterances begin within the conversation thread. A turn session may also be identified by determining where a user handed off (e.g., turned over) a task to another user and/or a digital assistant. In embodiments, the turn demarcation component 210 may group/demarcate turn sessions messages based on temporal proximity and/or utterance type classification labels.

In embodiments, the process mining device 102 may use an edge rationalization component 212 to analyze the labeled utterances of the conversation threads and reduce edges when generating the attributed DFG 220. Edge rationalization component 212 may merge various utterances in the conversation threads, and/or filter non-essential utterances from each conversation thread.

In embodiments, the process mining device 102 may use a domain-specific feature engineering component 214 to apply conversation topic mining on first utterances of each user and label topics for each event label in an attributed trace instance of the generated attributed DFG 220. Further, the domain-specific feature engineering component 214 may apply natural language understanding to identify complete and/or incomplete conversations and attributes to all the labeled events in attributed traces instances. The domain-specific feature engineering component 214 may further identify where digital assistants have successfully completed tasks and/or failed to complete an execution task.

In embodiments, the process mining device 102 may use a DFG discovery component 216 to perform process discovery on the labeled utterances of the conversation threads.

The DFG discovery 216 may assess the behavior and fit of the process workflow model with respect to the users of the asynchronous conversation threads. The DFG discovery component 216 may identify where bottlenecks and/or inefficiencies occur by analyzing the generated attributed DFG 220. The DFG discovery component 216 may input/apply hyper parameters 218 to optimize the modeling and generation of the attributed DFG 220.

Figure 3A:
FIG. 3A illustrates an example event log for generating a DFG, in accordance with some embodiments of the present disclosure.

Referring now to FIG. 3A, shown is an example event log 300 used for generating a standard DFG, in accordance with some embodiments of the present disclosure. A DFG may be generated from a log or series of events. An a-event is an event corresponding to activity a from A (set of a_i) at time stamp t. A trace is a sequence of a-events which share a common trace-ID (e.g., a case ID or a process instance ID). The event log 300 comprises trace IDs 1 and 2. The event log 300 includes a set of nodes that corresponds to a set of activities from A and edge a→b, where an a-event b occurs immediately after a-event a. Trace ID 1 includes nodes/activities a, b, and c and the associated date and time when the given activity occurred. Trace ID 2 includes nodes/activities a and c and the associated date and time when the given activity occurred. It is noted that event log 300 is a simplified version of an event log used for explanation purposes only and that more complex event logs may be used.

Figure 3B:
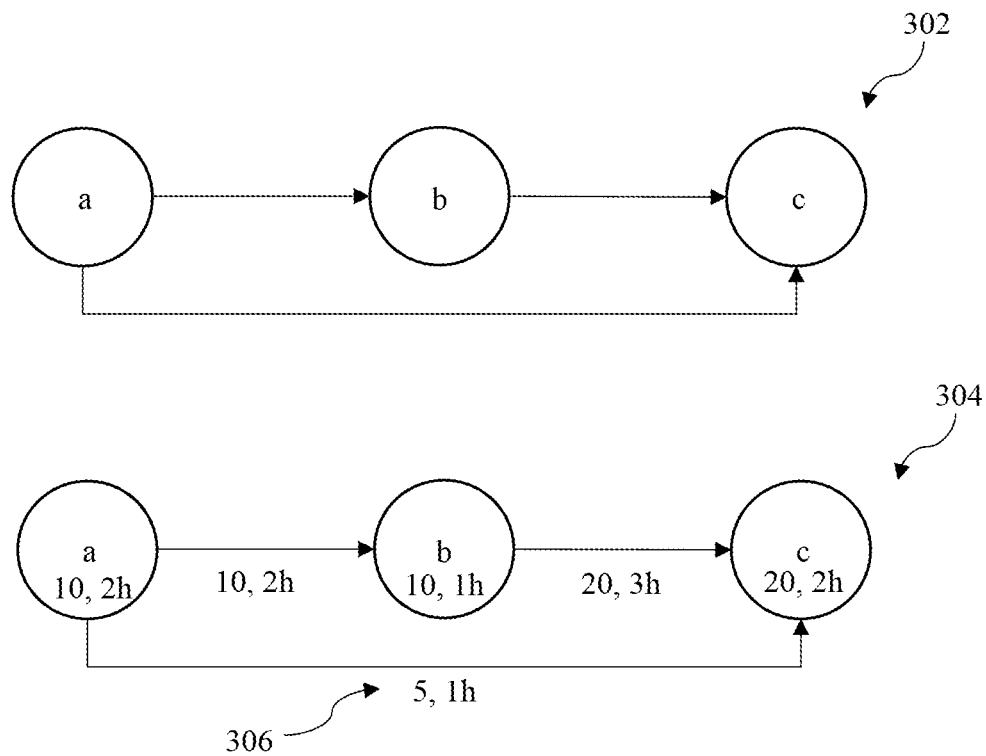
FIG. 3B illustrates an example DFG and an example attributed DFG generated from the example event log of FIG. 3A, in accordance with some embodiments of the present disclosure.

FIG. 3B illustrates an example DFG 302 and an example attributed DFG 304 generated from the example event log 300 of FIG. 3A, in accordance with some embodiments of the present disclosure. In the illustrated embodiment, DFG 302 is a simplified DFG that does not include attributes associated with the set of nodes. DFG 302 shows trace ID 1 having arrows/edges going from node a to node b to node c. DFG 302 shows trace ID 2 having arrows/edges going from node a to node c. DFG 304 includes time attributes (e.g., average activity durations or waiting times) that are associated with each trace ID for the given nodes. Using the attributed DFG 304 allows a user to pinpoint where activities and/or processes may be improved, such as by identifying processing bottlenecks or inefficiencies, determining workflow effectiveness, and/or identifying various automation opportunities for improving workflow. Embodiments of the present disclosure utilize directly follows graphing techniques and apply them to asynchronous conversation threads to identify areas for hybrid workforce process improvement as further discussed below.

Figure 4A:
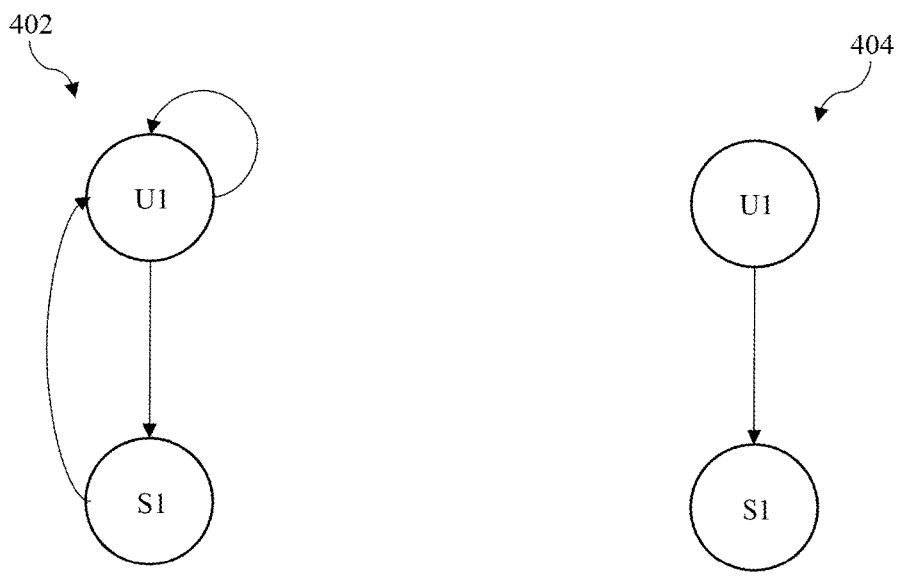
FIG. 4A illustrates an example conversation thread between two users, in accordance with some embodiments of the present disclosure.

Referring now to FIG. 4A, shown an example conversation thread 400 between two users, in accordance with some embodiments of the present disclosure. In the illustrated embodiment, the conversation thread 400 includes user 1 (e.g., a regular employee or worker) and skilled user 1 (e.g., IT support personnel). The conversation thread 400 comprises a plurality of utterances generated by each of the respective users. Further, the conversation thread 400 includes timestamp information relating to when each utterance by the respective user was generated.

Referring now to FIG. 4B, shown is an example DFG 402, in accordance with some embodiments of the present disclosure. In the illustrated embodiment, the example DFG 402 is a simplified representation of a DFG that can be generated from conversation thread 400. User 1 is classified as node "U1" and skilled user 1 is classified as node "S1" within DFG 402. As depicted, the DFG 402 includes the two nodes and connection arrows/edges representing the conversation log of the conversation thread 400.

Referring now to FIG. 4C, an example DFG 404 with edge rationalization applied, in accordance with some embodiments of the present disclosure. In the illustrated embodiment, the connection arrows/edges of DFG 404 are reduced by utilizing edge rationalization. For example, returning to FIG. 4A, the process mining device 102 may merge utterances together that have a temporal proximity (e.g., user 1 utterances at timestamp 10:00 and 10:01) and also may remove any utterances that are non-essential (e.g., user 1 utterance at 11:10). In this way, edge rationalization can simply and/reduce edges when generating a DFG.

Figures 5A, 5B, 5C:
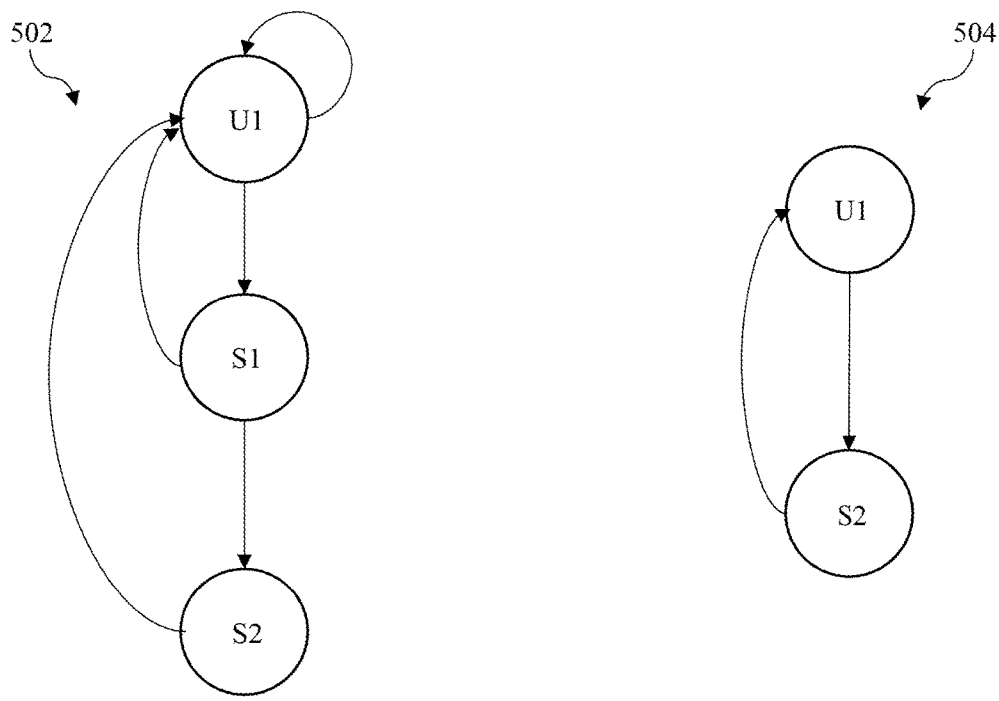
FIG. 5A illustrates an example conversation thread between a plurality of users, in accordance with some embodiments of the present disclosure.
FIG. 5B illustrates an example DFG, in accordance with some embodiments of the present disclosure.
FIG. 5C illustrates an example DFG with edge rationalization applied, in accordance with some embodiments of the present disclosure.

Referring now to FIG. 5A, shown is an example conversation thread 500 between a plurality of users, in accordance with some embodiments of the present disclosure. In the illustrated embodiment, the conversation thread 500 includes user 1, skilled user 1, and skilled user 2. The conversation thread 500 further includes timestamp information relating to when each utterance was generated by the respective user.

Referring now to FIG. 5B, shown is an example DFG 502, in accordance with some embodiments of the present disclosure. In the illustrated embodiment, the example DFG 502 is a simplified representation of a DFG that can be generated from conversation thread 500. User 1 is classified as node "U1", skilled user 1 is classified as node "S1", and skilled user 2 is classified as node "S2" within DFG 502. As depicted, the DFG 502 includes the three nodes and connection arrows/edges representing the conversation log of the conversation thread 500.

Referring now to FIG. 5C, shown is an example DFG 504 with edge rationalization applied, in accordance with some embodiments of the present disclosure. In the illustrated embodiment, the connection arrows/edges of DFG 504 are reduced by utilizing edge rationalization. For example, returning to FIG. 5A, the process mining system may merge utterances that have a temporal proximity (e.g., user 1 utterances at timestamps 10:00, 10:45, and 10:46), remove utterances that include a handoff to another user/skilled user (e.g., skilled user 1 utterance at 10:47) and also may remove any utterances that are non-essential (e.g., user 1 utterance at 11:01, skilled user 2 utterance at 10:49). In this way, edge rationalization can simplify and/or reduce edges when generating an attributed DFG. Using edge rationalization on the DFG reduces "spaghetti-ness" and provides a simplified visual of the process workflow where the user 1 requested a task and it was ultimately completed by skilled user 2 as shown in the attributed DFG 504, where any unnecessary edges/nodes were removed.

Figure 6:
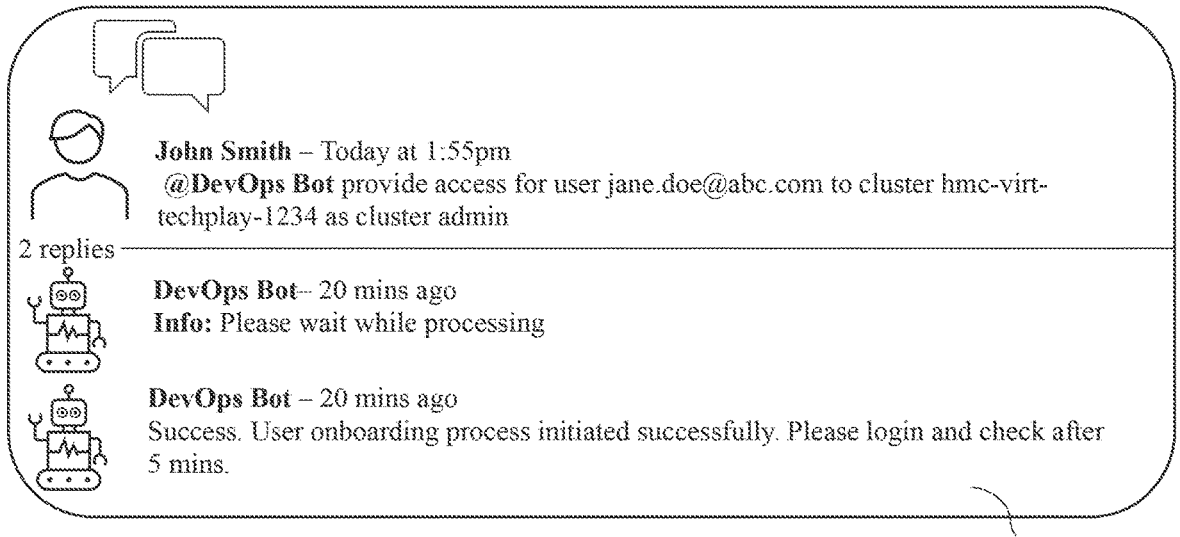
FIG. 6 illustrates an example conversation thread between a user and a digital assistant, in accordance with some embodiments of the present disclosure.

Referring now to FIG. 6, illustrated is an example conversation thread 600 between a user and a digital assistant, in accordance with some embodiments of the present disclosure. In the illustrated embodiment, a user "John Smith" requests that a digital assistant "DevOpsBot" perform a task (e.g., provide access for a user). As shown, the task is successfully performed by the digital assistant as indicated in the thread. In embodiments, successful/unsuccessful performance of the task may be identified or collected from the conversation thread, a digital assistant log, or both.

Figure 7:
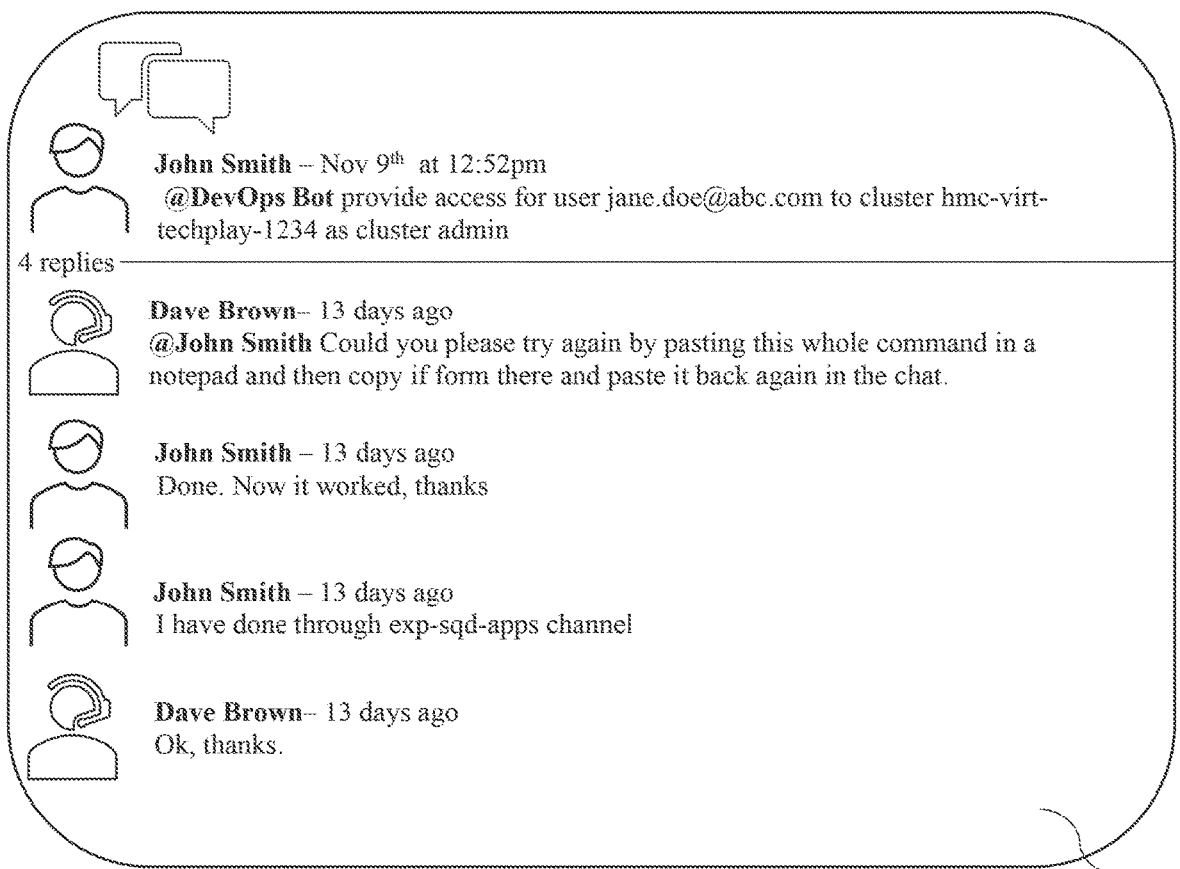
FIG. 7 illustrates an example conversation thread between a plurality of users in response to a digital assistant's failure to complete a task, in accordance with some embodiments of the present disclosure.

Referring now to FIG. 7, illustrated is an example conversation thread 700 between a plurality of users in response to a digital assistant failure to complete a task, in accordance with some embodiments of the present disclosure. In the illustrated embodiment, a user "John Smith" requests that a digital assistant "DevOpsBot" perform a task (e.g., provide access for a user). As shown, the digital assistant fails to complete the task successfully as indicated in the thread. Because the task was not completed successfully by the digital assistant, a skilled user "Dave Brown" is required to join the conversation thread in order to complete the task. The process mining device 102 is configured to identify where various tasks are successfully completed as shown in FIG. 6 and where tasks are not successfully completed as shown in FIG. 7. For example, the process mining device 102 may identify where incomplete conversations occur, where digital assistants fail to complete a task by correlating the conversation thread with digital assistant logs, and where additional skilled users are required to help complete tasks based on the threads. Using visual analytics via the attributed DFG graph, the process mining device 102 can quickly identify where various bottlenecks and/or IT support performance issues occur within the hybrid workforce environment.

Figure 8:
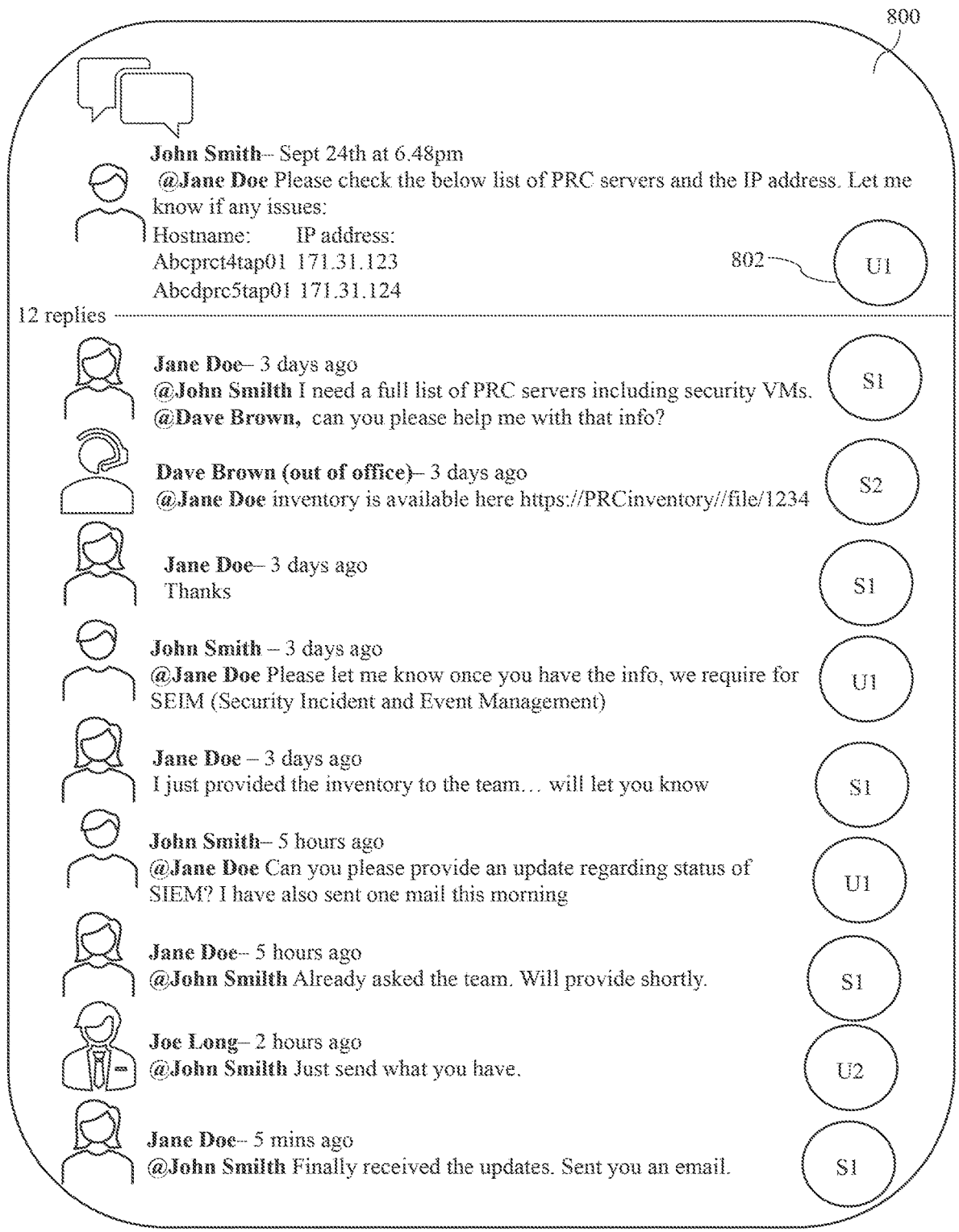
FIG. 8 illustrates an example conversation thread between a plurality of users wherein the users are classified using a role-specific list of users, in accordance with some embodiments of the present disclosure.

FIG. 8 illustrates an example conversation thread 700 between a plurality of users wherein the users are classified using a role-specific list of users, in accordance with some embodiments of the present disclosure. In the illustrated embodiment, the process mining device 102 of FIG. 1 is configured to identify each user within the conversation thread and determine their user-specific role. The role determination may be performed by analyzing user profile attributes or characteristics for each given user. The system will classify each user by their user-specific role and generate a user-specific node 802 for each given user in an attributed DFG (as shown in FIG. 8). In embodiments, the classification of user-specific roles may be performed by natural language understanding. Once user are assigned their user-specific roles, the system may group utterances associated with the user within each user-specific node. For example, the generated DFG may group all utterances generated by U1 in a single node in order to reduce node frequency withing the DFG.

Figure 9:
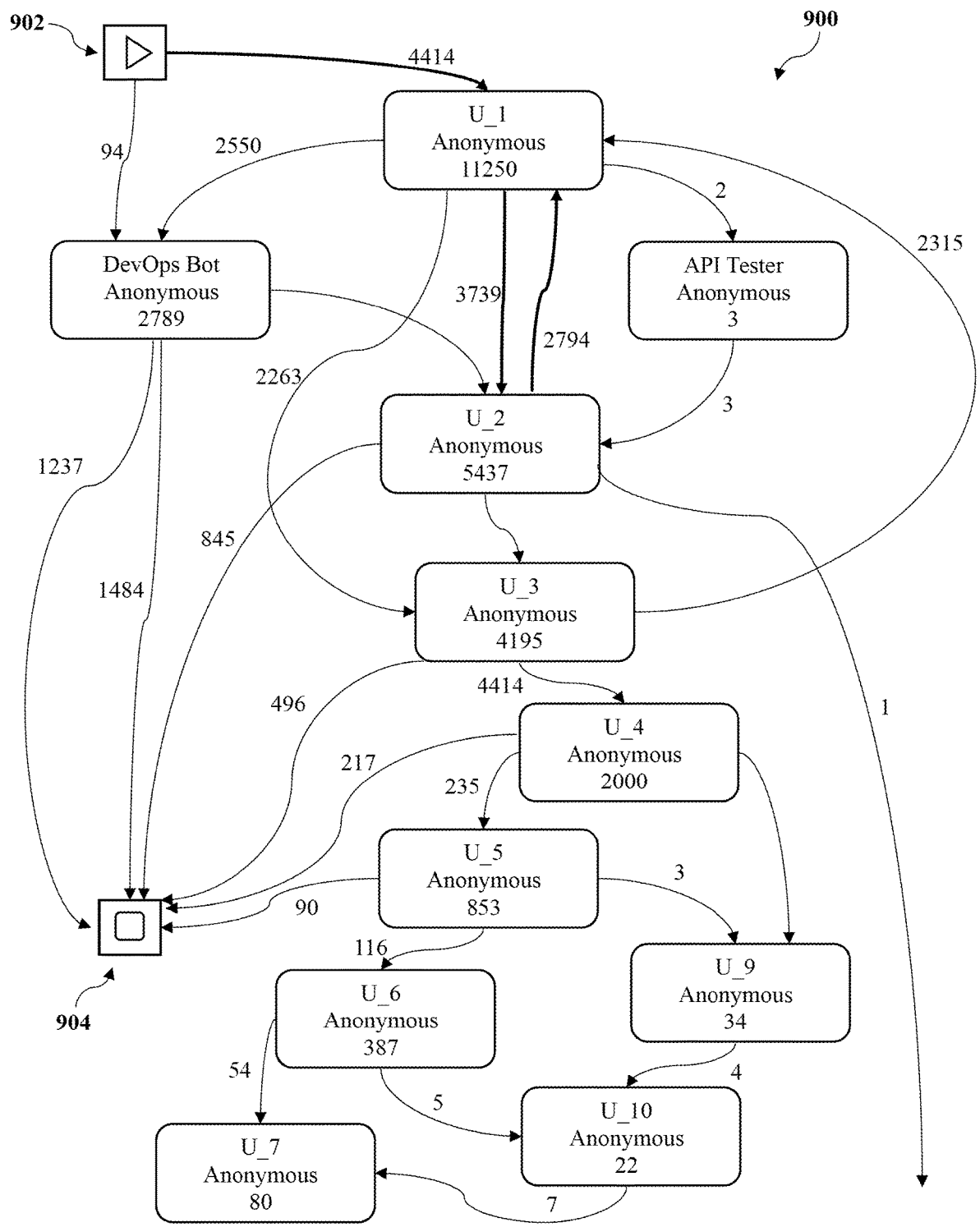
FIG. 9 illustrates an example DFG, in accordance with some embodiments of the present disclosure.

FIG. 9 illustrates an example attributed DFG 900, in accordance with some embodiments of the present disclosure. It is noted that the reference numbers in the figure are bolded in order to differentiate the reference numbers from the attributes associated with the edge connections of the DFG 900. In the illustrated embodiment, the DFG 900 depicts an IT support process thread that starts at 902 and ends at 904. DFG 900 is shown without edge rationalization techniques being applied. As shown, the DFG 900 includes multiple edge connections to various users. Other representations may include significantly more connections and user nodes thus making the DFG chart visually unusable (ineffective) for visual analytics and process mining purposes.

Figure 10:
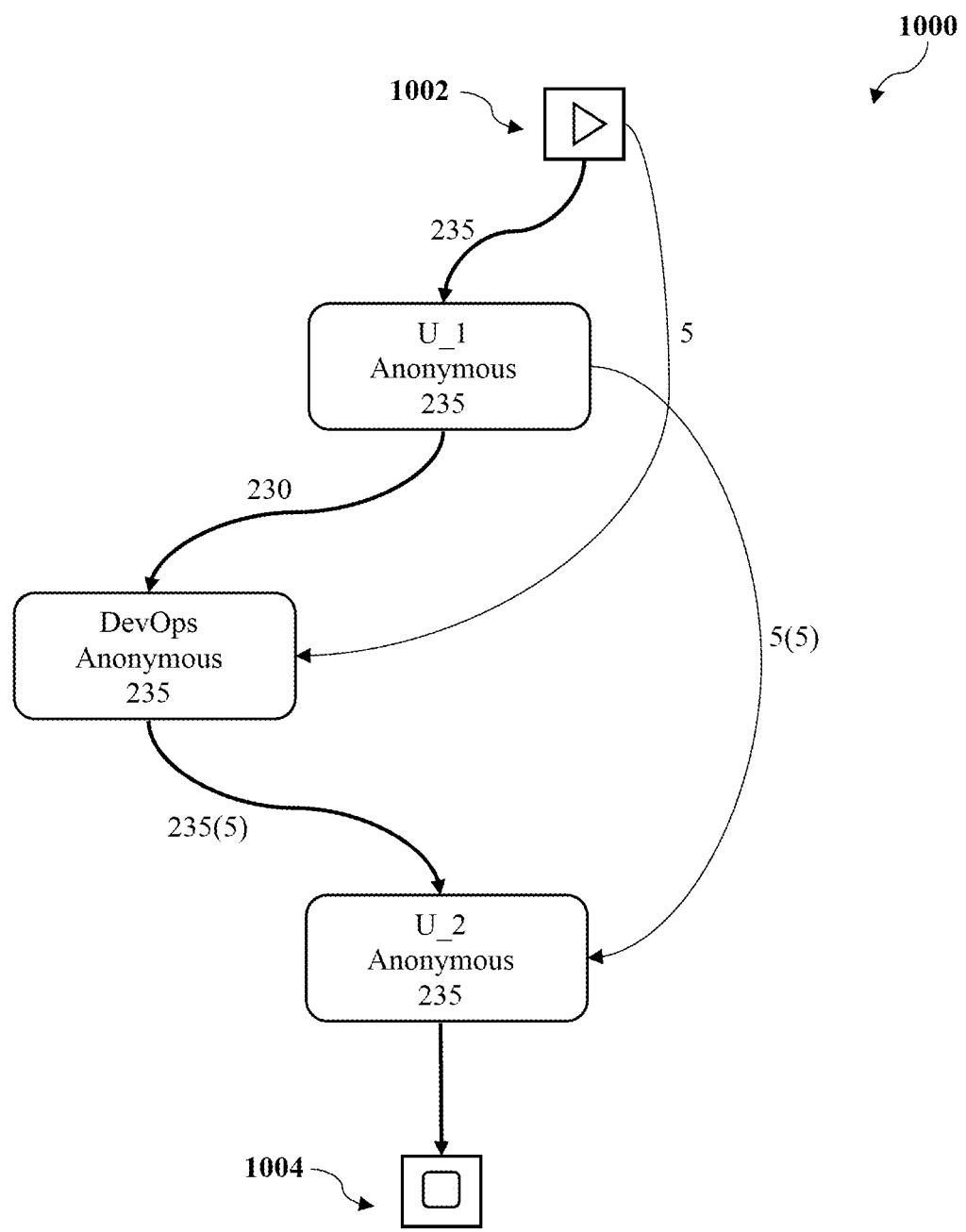
FIG. 10 illustrates an example attributed DFG, in accordance with some embodiments of the present disclosure.

FIG. 10 illustrates an example attributed DFG 1000 with edge rationalization applied, in accordance with some embodiments of the present disclosure. It is noted that the reference numbers in the figure are bolded in order to differentiate the reference numbers from the attributes associated with the edge connections of the DFG 1000. In the illustrated embodiment, the DFG 1000 depicts an IT support process thread that starts at 1002 and ends at 1004. DFG 1000 is shown with edge rationalization techniques applied. For example, edge rationalization techniques may include merging utterances within a temporal proximity from the same user, classifying utterances to differentiate message continuum or if the message is a new turn, and filtering non-essential utterances. As shown, the DFG 1000 significantly reduces the connections/edges between the relevant user nodes. Further, by applying the process mining techniques, the number of non-essential users and conversations/utterances are removed from the graph to easily identify where support process bottlenecks may occur. Using the attributed DFG 1000, the process mining device 102 may transform asynchronous conversations threads to a domain-specific activity trace instance with rationalized edges and nodes to be used for visual analytics purposes.

FIG. 11 illustrates an example attribute table 1100 associated with an attributed DFG, in accordance with some embodiments of the present disclosure. In the illustrated embodiment, the attribute table 1100 includes a set of attributes related to each user of an attributed DFG. For example, the table 1100 includes a frequency, a percentage, a service time, and a throughput for each of the give users with respect to given IT support task(s). For example, the frequency may indicate how often a skilled user is requested to perform a specific task (e.g., Dave Brown 303 tasks) and the percentage may be based on total tasks within the process workflow. The service time may indicate the length of time taken for the skilled user/bot to complete the given task, while the throughput time may indicate the length of time for which the workflow process is completed.

In embodiments, the attribute table 1100 may be generated from attributed DFG. In the example table 1100, the process mining device 102 may identify that "DevOpsBot" has a long service time and a long throughput time when compared to other nodes within the attributed DFG. The process mining device 102 may pinpoint that there may be an issue with the "DevOpsBot" when given tasks to complete based on the given attribute values. In some embodiments, the process mining device 102 may be automatically configured to fix or improve processes that may have issues, such as updating algorithms of the digital assistant or rerouting the IT support workflow process to another skilled user or digital assistant, in order to improve the effectiveness of the IT support workflow.

Figure 12:
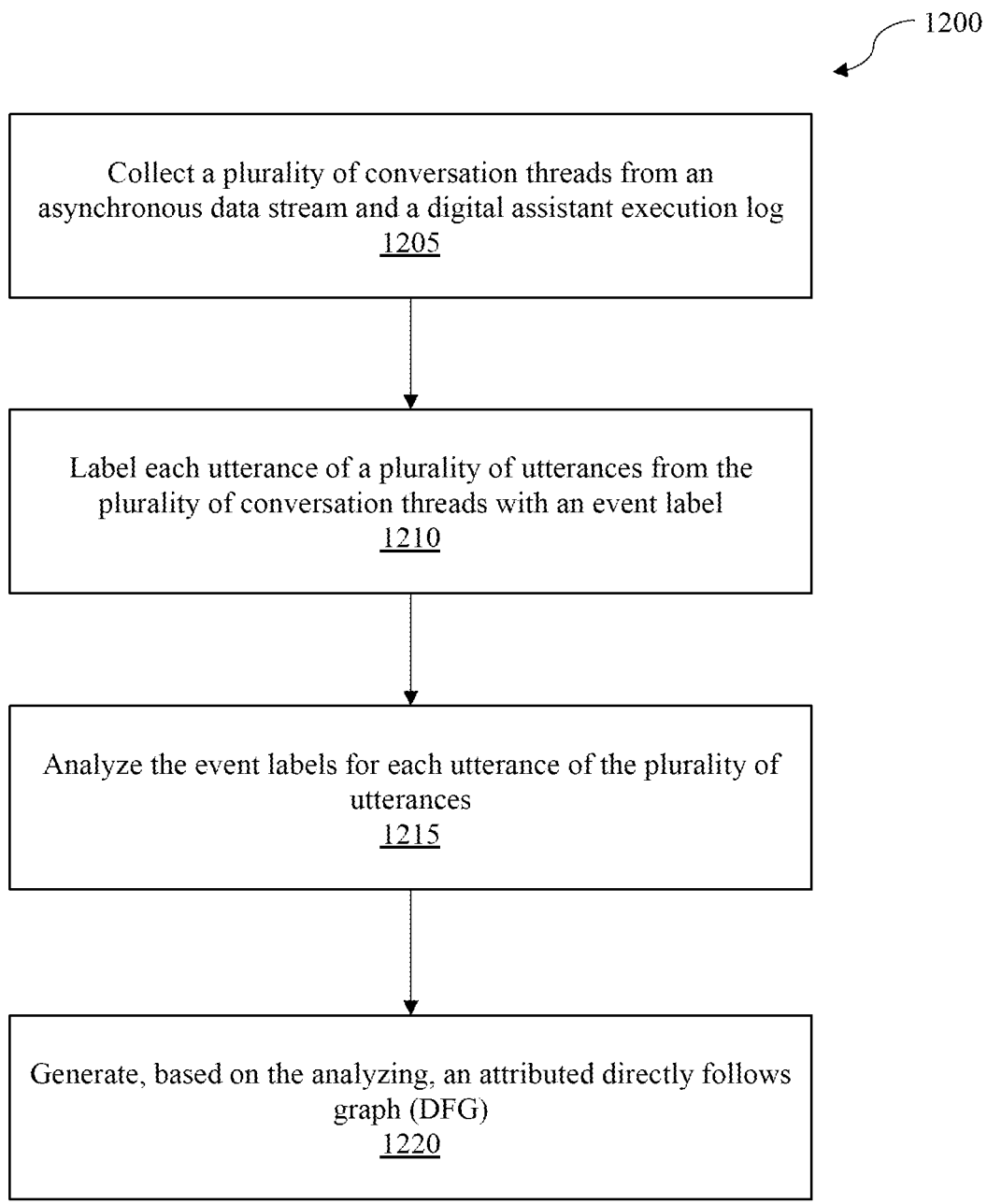
FIG. 12 illustrates an example process for generating an attributed DFG, in accordance with some embodiments of the present disclosure.

FIG. 12 illustrates an example process 1200 for generating an attributed DFG, in accordance with some embodiments of the present disclosure. The process 1200 may be performed by processing logic that comprises hardware (e.g., circuitry, dedicated logic, programmable logic, microcode, etc.), software (e.g., instructions run on a processor), firmware, or a combination thereof. In some embodiments, the process 1200 is a computer-implemented process. In embodiments, the process 1200 may be performed by processor 106 of process mining device 102 exemplified in FIG. 1.

The process 1200 begins by collecting a plurality of conversation threads from an asynchronous data stream and a digital assistant execution log. This is illustrated at step 1205. For example, the process mining device 102 may collect threads from messaging channels where IT support and various users interact to complete various tasks (e.g., resolving software/hardware related issues, answering queries, performing IT specific actions, automated tasks, etc.). The plurality of conversation threads may comprise a plurality of utterances from each user in the given thread. In embodiments, each utterance may comprise a single word or a plurality of words (e.g., sentences, messages, etc.) that are generated by the given user in the conversation thread. Further, the system may collect digital assistant logs that indicate digital assistant(s) performance of various tasks related to the conversation thread within the hybrid workforce environment. The digital assistant log may comprise a plurality of task execution instances related to a given digital assistant. The task execution instances may indicate whether a given task was successfully or unsuccessfully performed by a digital assistant associated with one or more conversation threads.

The process 1200 continues by labeling each utterance of a plurality of utterances from the plurality of conversation threads with an event label. This is illustrated at step 1210.

Each event label may include a plurality of attributes. Attributes may include an identification value, activity type, timestamp information, trace information, event log information for each utterance of the plurality of utterances.

The process 1200 continues by analyzing the event labels for each utterance of the plurality of utterances. This is illustrated at step 1215. The analyzing may include generating, for each thread of the plurality of conversation threads, a role-specific ordered list of users within the thread and classifying each utterance of the plurality utterances that are associated with each user of each thread to identify a type of utterance. In embodiments, the system may classify a given utterance of the plurality of utterances as an acknowledgement, status query, information query, an action, or a handover, for example. In embodiments, the system may filter one or more utterances that failed to be classified. For example, the system may filter out chit chat and/or non-essential utterances such as greetings. In embodiments, the system may merge two or more utterances of the plurality of utterances that have a temporal proximity from a same user within the thread.

The process 1200 continues by generating, based on the analyzing, an attributed directly follows graph (DFG). This is illustrated at step 1220. In embodiments, the process mining device 102 may analyze the generated attributed DFG to identify one or more incomplete conversations within the plurality of conversation threads. The system may identify, based on the analyzing, a digital assistant or user has failed to complete a task associated with a conversation thread. In some embodiments, the system may apply topic mining on first utterances and label topics for each event in an attributed trace instance of the DFG. In some embodiments, the process mining device 102 may evaluate the specific roles of users within the process workflow. For example, the process mining device 102 may identify where various users and/or digital assistants create bottlenecks based on evaluating the trace instances of the attributed DFG. In some embodiments, the system may evaluate the digital assistant that has failed to complete the task and implement an update to the digital assistant in order to complete the task.

Figure 13:
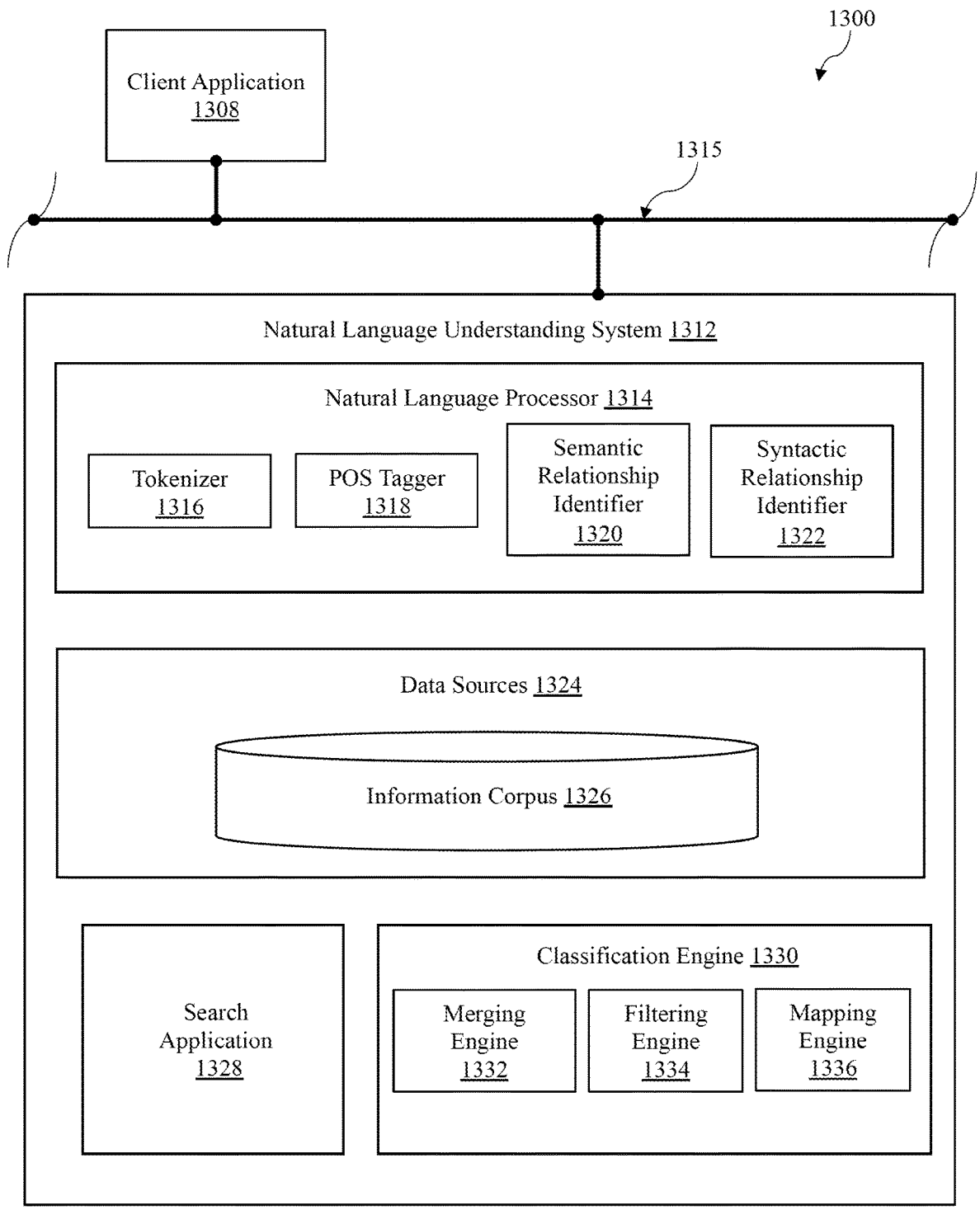
FIG. 13 illustrates a block diagram of an example natural language understanding system configured to analyze unstructured textual data from asynchronous conversation threads, in accordance with some embodiments of the present disclosure.

Referring now to FIG. 13, shown is a block diagram of an exemplary system architecture 1300, including a natural language understanding system 1312, configured to analyze unstructured textual data from asynchronous conversation threads, in accordance with some embodiments of the present disclosure. In embodiments, conversation threads/utterances collected from asynchronous data stream 130 and digital assistant logs 140 may be analyzed by the natural language understanding system 1312 which may be housed on process mining device 102 of FIG. 1. The process mining device 102 may include a client application 1308, which may be used to initiate collecting the asynchronous conversation thread data over network 1315.

Consistent with various embodiments, the natural language understanding system 1312 may respond to process mining functions initiated by the client application 1308. Specifically, the natural language understanding system 1312 may analyze conversation threads to extract contextual information to identify various context and/or attributes related to generation of DFGs. In some embodiments, the natural language understanding system 1312 may include a natural language processor 1314, data sources 1324, a search application 1328, and a classification engine 1330. The natural language processor 1314 may be a computer module that analyzes the conversation thread/utterance data, associated metadata, unstructured data, etc. The natural language processor 1314 may perform various methods and techniques for analyzing the contextual data (e.g., syntactic analysis, semantic analysis, etc.). The natural language processor 1314 may be configured to recognize and analyze any number of natural languages. In some embodiments, the natural language processor 1314 may parse textual content of the asynchronous conversation threads. Further, the natural language processor 1314 may include various modules to perform analyses of textual data. These modules may include, but are not limited to, a tokenizer 1316, a part-of-speech (POS) tagger 1318, a semantic relationship identifier 1320, and a syntactic relationship identifier 1322.

In some embodiments, the tokenizer 1316 may be a computer module that performs lexical analysis. The tokenizer 1316 may convert a sequence of characters into a sequence of tokens. A token may be a string of characters included in an electronic document (text document, spreadsheet, webpage, etc.) and categorized as a meaningful symbol. Further, in some embodiments, the tokenizer 1316 may identify word boundaries in an electronic document and break any text passages within the document into their component text elements, such as words, multiword tokens, numbers, and punctuation marks. In some embodiments, the tokenizer 1316 may receive a string of characters, identify the lexemes in the string, and categorize them into tokens.

Consistent with various embodiments, the POS tagger 1318 may be a computer module that marks up a word in passages to correspond to a particular part of speech. The POS tagger 1318 may read a passage or other text in natural language and assign a part of speech to each word or other token. The POS tagger 1318 may determine the part of speech to which a word (or other text element) corresponds based on the definition of the word and the context of the word. The context of a word may be based on its relationship with adjacent and related words in a phrase, sentence, or paragraph. In some embodiments, the context of a word may be dependent on one or more previously analyzed electronic documents (e.g., the content of one article on an entity may shed light on the meaning of text elements in another article on the same entity, particularly if they are part of the same corpus or universe). Examples of parts of speech that may be assigned to words include, but are not limited to, nouns, verbs, adjectives, adverbs, and the like. Examples of other part of speech categories that POS tagger 1318 may assign include, but are not limited to, comparative or superlative adverbs, wh-adverbs, conjunctions, determiners, negative particles, possessive markers, prepositions, wh-pronouns, and the like. In some embodiments, the POS tagger 1318 may tag or otherwise annotate tokens of a passage with part of speech categories. In some embodiments, the POS tagger 1318 may tag tokens or words of a passage to be parsed by the natural language understanding system 1312.

In some embodiments, the semantic relationship identifier 1320 may be a computer module that may be configured to identify semantic relationships of recognized text elements (e.g., words, phrases) in electronic documents and/or conversation threads. In some embodiments, the semantic relationship identifier 1320 may determine functional dependencies between entities and other semantic relationships.

Consistent with various embodiments, the syntactic relationship identifier 1322 may be a computer module that may be configured to identify syntactic relationships in a passage composed of tokens. The syntactic relationship identifier 1322 may determine the grammatical structure of sentences such as, for example, which groups of words are associated as phrases and which word is the subject or object of a verb. The syntactic relationship identifier 1322 may conform to formal grammar.

In some embodiments, the natural language processor 1314 may be a computer module that may parse asynchronous conversation data of a conversation thread with respect to classifying each utterance of the conversation with the respective user.

In some embodiments, the output of the natural language processor 1314 may be stored as an information corpus 1326 in one or more data sources 1324. In some embodiments, data sources 1324 may include data warehouses, information corpora, data models, and document repositories. The information corpus 1326 may enable data storage and retrieval. In some embodiments, the information corpus 1326 may be a storage mechanism that houses a standardized, consistent, clean, and integrated copy of the ingested and parsed electronic documents used to generate confidence values between the copied data and the input fields of the paste environment. Data stored in the information corpus 1326 may be structured in a way to specifically address analytic requirements. In some embodiments, the information corpus 1326 may be a relational database.

In some embodiments, the natural language understanding system 1312 may include a classification engine 1330. The classification engine 1330 may be a computer module that is configured to calculate one or more confidence values related to classifying the given utterance of each conversation thread. In some embodiments, the classification engine 1330 may contain submodules. For example, the classification engine 1330 may contain a merging engine 1332, filtering engine 1334, and a mapping engine 1336. The merging engine 1332 may be configured to identify which utterances generated by a respective user may be merged together based on a temporal proximity value. The filtering engine 1334 may be configured to identify utterances that may be classified as non-essential and remove those utterance from attributed DFG generation. The mapping engine 1336 is configured to align each given utterance from the conversation with each role-specific user and/or role-specific node generated in the DFG.

Figure 14:
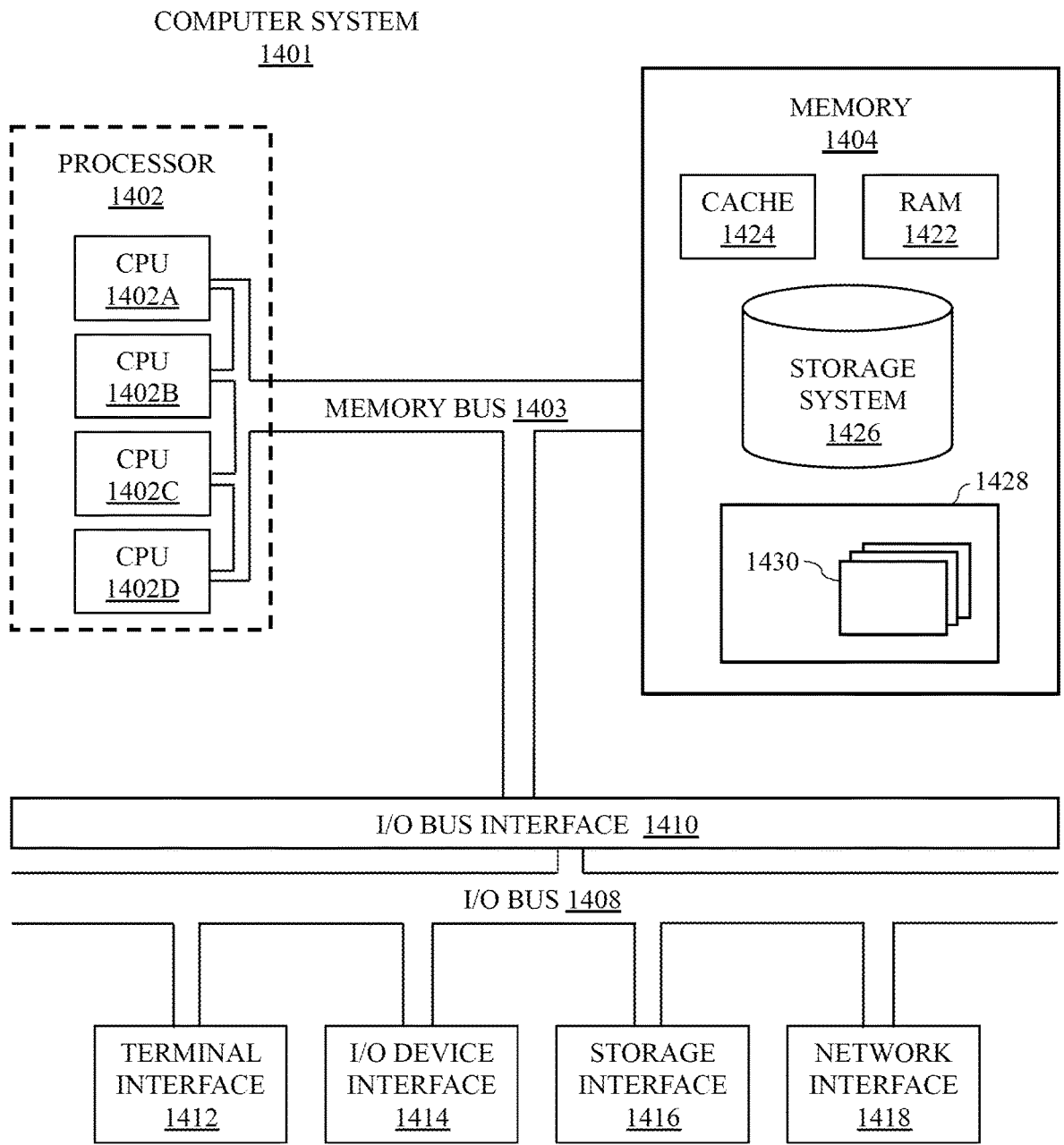
FIG. 14 illustrates a high-level block diagram of an example computer system that may be used in implementing one or more of the methods, tools, and modules, and any related functions, described herein, in accordance with embodiments of the present disclosure.

Referring now to FIG. 14, shown is a high-level block diagram of an example computer system 1401 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 501 may comprise one or more CPUs 1402, a memory subsystem 1404, a terminal interface 1412, a storage interface 1416, an I/O (Input/Output) device interface 1414, and a network interface 1418, all of which may be communicatively coupled, directly or indirectly, for inter-component communication via a memory bus 1403, an I/O bus 1408, and an I/O bus interface 1410.

The computer system 1401 may contain one or more general-purpose programmable central processing units (CPUs) 1402A, 1402B, 1402C, and 1402D, herein generically referred to as the CPU 1402. In some embodiments, the computer system 1401 may contain multiple processors typical of a relatively large system; however, in other embodiments the computer system 1401 may alternatively be a single CPU system. Each CPU 1402 may execute instructions stored in the memory subsystem 1404 and may include one or more levels of on-board cache. In some embodiments, a processor can include at least one or more of, a memory controller, and/or storage controller. In some embodiments, the CPU can execute the processes included herein (e.g., process 1200 as described in FIG. 12). In some embodiments, the computer system 1401 may be configured as processing mining system 100 of FIG. 1.

System memory subsystem 1404 may include computer system readable media in the form of volatile memory, such as random-access memory (RAM) 1422 or cache memory 1424. Computer system 1401 may further include other removable/non-removable, volatile/non-volatile computer system data storage media. By way of example only, storage system 1426 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory subsystem 1404 can include flash memory, e.g., a flash memory stick drive or a flash drive. Memory devices can be connected to memory bus 1403 by one or more data media interfaces. The memory subsystem 1404 may include at least one program product having a set (e.g., at least one) of program modules that are configured to carry out the functions of various embodiments.

Although the memory bus 1403 is shown in FIG. 14 as a single bus structure providing a direct communication path among the CPUs 1402, the memory subsystem 1404, and the I/O bus interface 1410, the memory bus 1403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 1410 and the I/O bus 1408 are shown as single units, the computer system 1401 may, in some embodiments, contain multiple I/O bus interfaces 1410, multiple I/O buses 1408, or both. Further, while multiple I/O interface units are shown, which separate the I/O bus 1408 from various communications paths running to the various I/O devices, in other embodiments some or all of the I/O devices may be connected directly to one or more system I/O buses.

In some embodiments, the computer system 1401 may be a multi-user mainframe computer system, a single-user system, or a server computer or similar device that has little or no direct user interface, but receives requests from other computer systems (clients). Further, in some embodiments, the computer system 1401 may be implemented as a desktop computer, portable computer, laptop or notebook computer, tablet computer, pocket computer, telephone, smart phone, network switches or routers, or any other appropriate type of electronic device.

It is noted that FIG. 14 is intended to depict the representative major components of an exemplary computer system 1401. In some embodiments, however, individual components may have greater or lesser complexity than as represented in FIG. 14, components other than or in addition to those shown in FIG. 14 may be present, and the number, type, and configuration of such components may vary.

One or more programs/utilities 1428, each having at least one set of program modules 1430 may be stored in memory subsystem 1404. The programs/utilities 1428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs/utilities 1428 and/or program modules 1430 generally perform the functions or methodologies of various embodiments.

It is understood in advance that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various search servers through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider.

The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 15:
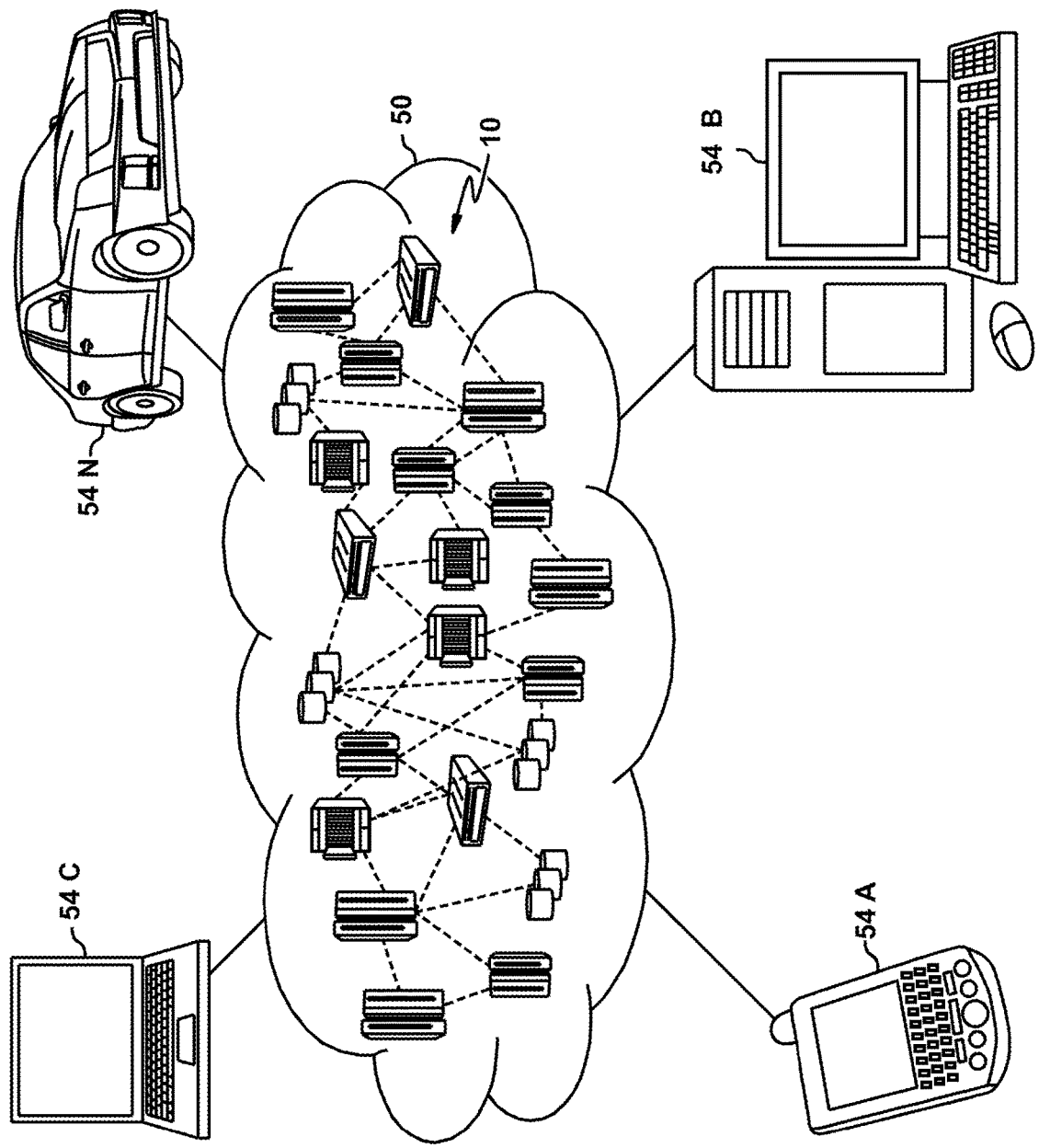
FIG. 15 depicts a cloud computing environment in accordance with embodiments of the present disclosure.

Referring now to FIG. 15, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 15 are intended to be illustrative only and that computing nodes 10 and cloud computing environment 50 can communicate with any type of computerized device over any type of network and/or network addressable connection (e.g., using a web browser).

Figure 16:
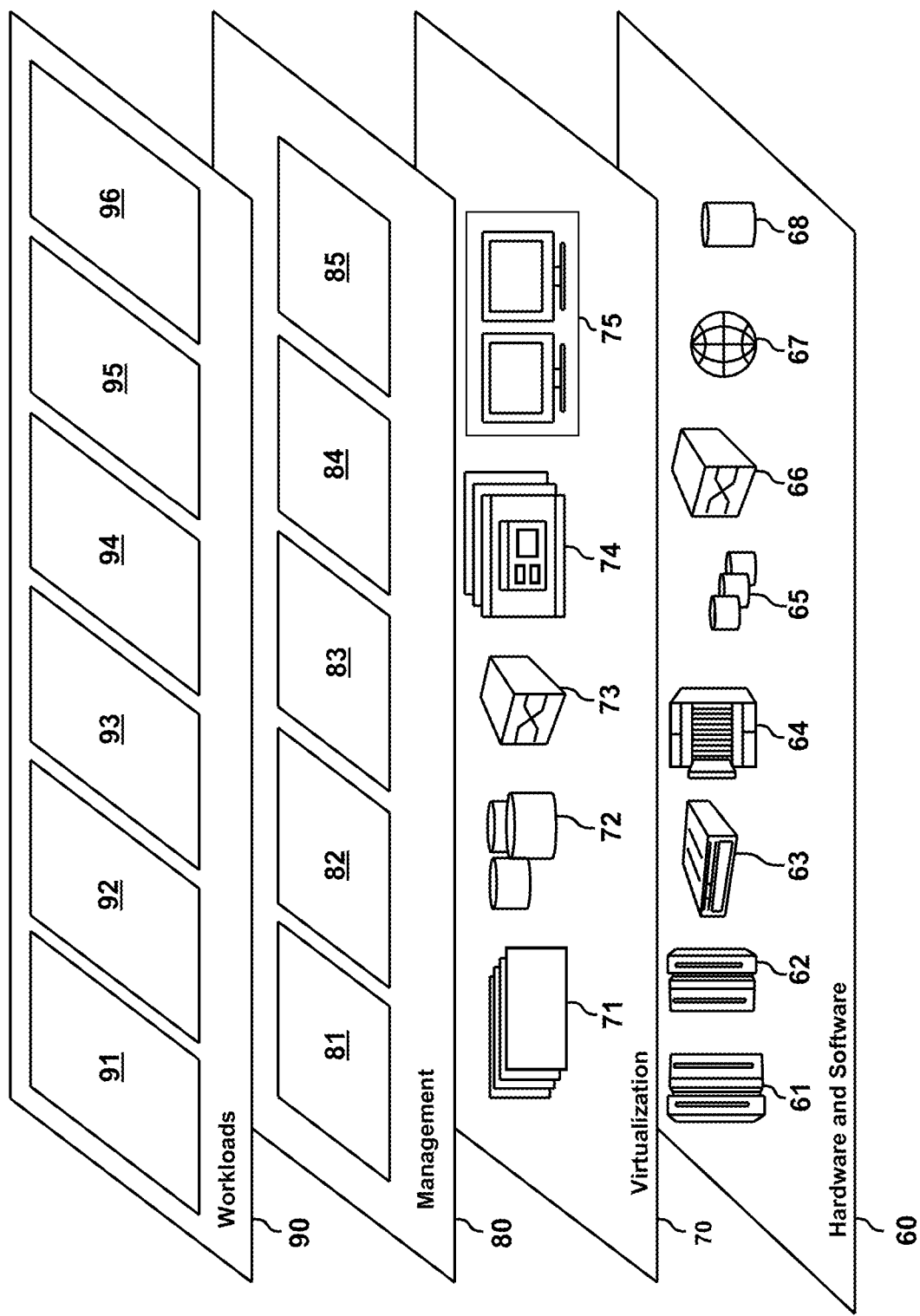
FIG. 16 depicts abstraction model layers in accordance with embodiments of the present disclosure.

Referring now to FIG. 16, a set of functional abstraction layers provided by cloud computing environment 50 (FIG. 15) is shown. It should be understood in advance that the components, layers, and functions shown in FIG. 16 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and process mining software 68 in relation to the process mining system 100 of FIG. 1.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and process mining management and processing 96. For example, process mining system 100 of FIG. 1 may be configured to manage process mining and attributed DFG generation using workloads layer 90.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

As used herein, "a number of" when used with reference to items, means one or more items. For example, "a number of different types of networks" is one or more different types of networks.

When different reference numbers comprise a common number followed by differing letters (e.g., 100a, 100b, 100c) or punctuation followed by differing numbers (e.g., 100-1, 100-2, or 100.1, 100.2), use of the reference character only without the letter or following numbers (e.g., 100) may refer to the group of elements as a whole, any subset of the group, or an example specimen of the group.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A computer-implemented method comprising:
    collecting a plurality of conversation threads related to a task from an asynchronous data stream;
    labeling each utterance of a plurality of utterances from the plurality of conversation threads with an event label;
    analyzing the event labels for each utterance of the plurality of utterances;
    generating, based on the analyzing, an attributed directly follows graph (DFG), wherein the DFG transforms the plurality of conversation threads into domain-specific, attributed-activity trace instances with rationalized edges and nodes, and wherein the DFG includes a minimized edge and node frequency based on an edge/node rationalization;
    identifying a cause of a process bottleneck or task failure in one or more digital assistants based on the attributed DFG; and
    modifying one or more algorithms in the one or more digital assistants that resolve the cause; and
    completing the task using the one or more modified algorithms in the one or more digital assistants.

2. The computer-implemented method of claim 1, wherein analyzing the event labels for each utterance of the plurality of utterances further comprises:
    generating, for each thread of the plurality of conversation threads, a role-specific ordered list of users within the thread; and
    classifying each utterance of the plurality utterances that are associated with each user of each thread to identify a type of utterance.

3. The computer-implemented method of claim 2, wherein classifying each utterance of the plurality of utterances that are associated with each user to identify the type of utterance comprises:
    classifying a given utterance of the plurality of utterances as the type selected from a group of utterance types consisting of an acknowledgement, a status query, an information query, an action, and a handover.

4. The computer-implemented method of claim 3, further comprising:
    filtering one or more utterances that failed to be classified.

5. The computer-implemented method of claim 2, further comprising:
    merging two or more utterances of the plurality of utterances that have a temporal proximity from a same user within the thread.

6. The computer-implemented method of claim 2, further comprising:
    marking, based on the event labels, a classification transition beyond a time proximity threshold as a turn boundary in a conversation thread.

7. The computer-implemented method of claim 1, further comprising:
    analyzing the attributed DFG to identify one or more incomplete conversations within the plurality of conversation threads; and
    identifying, based on the analyzing, a digital assistant has failed to complete a task associated with a conversation thread.

8. The computer-implemented method of claim 7, further comprising:
    evaluating the digital assistant that has failed to complete the task; and
    updating the digital assistant in order to complete the task.

9. A system comprising:
a processor; and
a computer-readable storage medium communicatively coupled to the processor and storing program instructions which, when executed by the processor, cause the processor to perform a method comprising:
collecting a plurality of conversation threads related to a task from an asynchronous data stream;
labeling each utterance of a plurality of utterances from the plurality of conversation threads with an event label;
analyzing the event labels for each utterance of the plurality of utterances;
generating, based on the analyzing, an attributed directly follows graph (DFG), wherein the DFG transforms the plurality of conversation threads into domain-specific, attributed-activity trace instances with rationalized edges and nodes, and wherein the DFG includes a minimized edge and node frequency based on an edge/node rationalization;
identifying a cause of a process bottleneck or task failure in one or more digital assistants based on the attributed DFG; and
modifying one or more algorithms in the one or more digital assistants that resolve the cause; and
completing the task using the one or more modified algorithms in the one or more digital assistants.

10. The system of claim 9, wherein analyzing the event labels for each utterance of the plurality of utterances:
generating, for each thread of the plurality of conversation threads, a role-specific ordered list of users within the thread; and
classifying each utterance of the plurality utterances that are associated with each user of each thread to identify a type of utterance.

11. The system of claim 10, wherein classifying each utterance of the plurality of utterances that are associated with each user to identify the type of utterance comprises:
classifying a given utterance of the plurality of utterances as the type selected from a group of utterance types consisting of an acknowledgement, a status query, an information query, an action, and a handover.

12. The system of claim 11, wherein the method performed by the processor further comprises:
filtering one or more utterances that failed to be classified.

13. The system of claim 10, wherein the method performed by the processor further comprises:
merging two or more utterances of the plurality of utterances that have a temporal proximity from a same user within the thread.

14. The system of claim 9, wherein the method performed by the processor further comprises:
analyzing the attributed DFG to identify one or more incomplete conversations within the plurality of conversation threads; and
identifying, based on the analyzing, a digital assistant has failed to complete a task associated with a conversation thread.

15. A computer program product comprising a computer-readable storage medium having program instructions embodied therewith, the program instructions executable by a processor to cause the processor to perform a method comprising:
collecting a plurality of conversation threads related to a task from an asynchronous data stream;
labeling each utterance of a plurality of utterances from the plurality of conversation threads with an event label;
analyzing the event labels for each utterance of the plurality of utterances;
generating, based on the analyzing, an attributed directly follows graph (DFG), wherein the DFG transforms the plurality of conversation threads into domain-specific, attributed-activity trace instances with rationalized edges and nodes, and wherein the DFG includes a minimized edge and node frequency based on an edge/node rationalization;
identifying a cause of a process bottleneck or task failure in one or more digital assistants based on the attributed DFG; and
modifying one or more algorithms in the one or more digital assistants that resolve the cause; and
completing the task using the one or more modified algorithms in the one or more digital assistants.

16. The computer program product of claim 15, wherein analyzing the event labels for each utterance of the plurality of utterances:
generating, for each thread of the plurality of conversation threads, a role-specific ordered list of users within the thread; and
classifying each utterance of the plurality utterances that are associated with each user of each thread to identify a type of utterance.

17. The computer program product of claim 16, wherein the method performed by the processor further comprises:
classifying a given utterance of the plurality of utterances as the type selected from a group of utterance types consisting of an acknowledgement, a status query, an information query, an action, and a handover; and
filtering one or more utterances that failed to be classified.

18. The computer program product of claim 15, wherein the method performed by the processor further comprises:
merging two or more utterances of the plurality of utterances that have a temporal proximity from a same user within the thread.

19. The computer program product of claim 15, wherein the method performed by the processor further comprises:
analyzing the attributed DFG to identify one or more incomplete conversations within the plurality of conversation threads; and
identifying, based on the analyzing, a digital assistant has failed to complete a task associated with a conversation thread.

20. The computer program product of claim 19, wherein the method performed by the processor further comprises:
evaluating the digital assistant that has failed to complete the task; and
updating the digital assistant in order to complete the task.

* * * * *